June 24, 1924.
E. L. BROOME
FLEXIBLE EXPANSION JOINT
Filed June 17, 1921
1,499,050
2 Sheets-Sheet 1
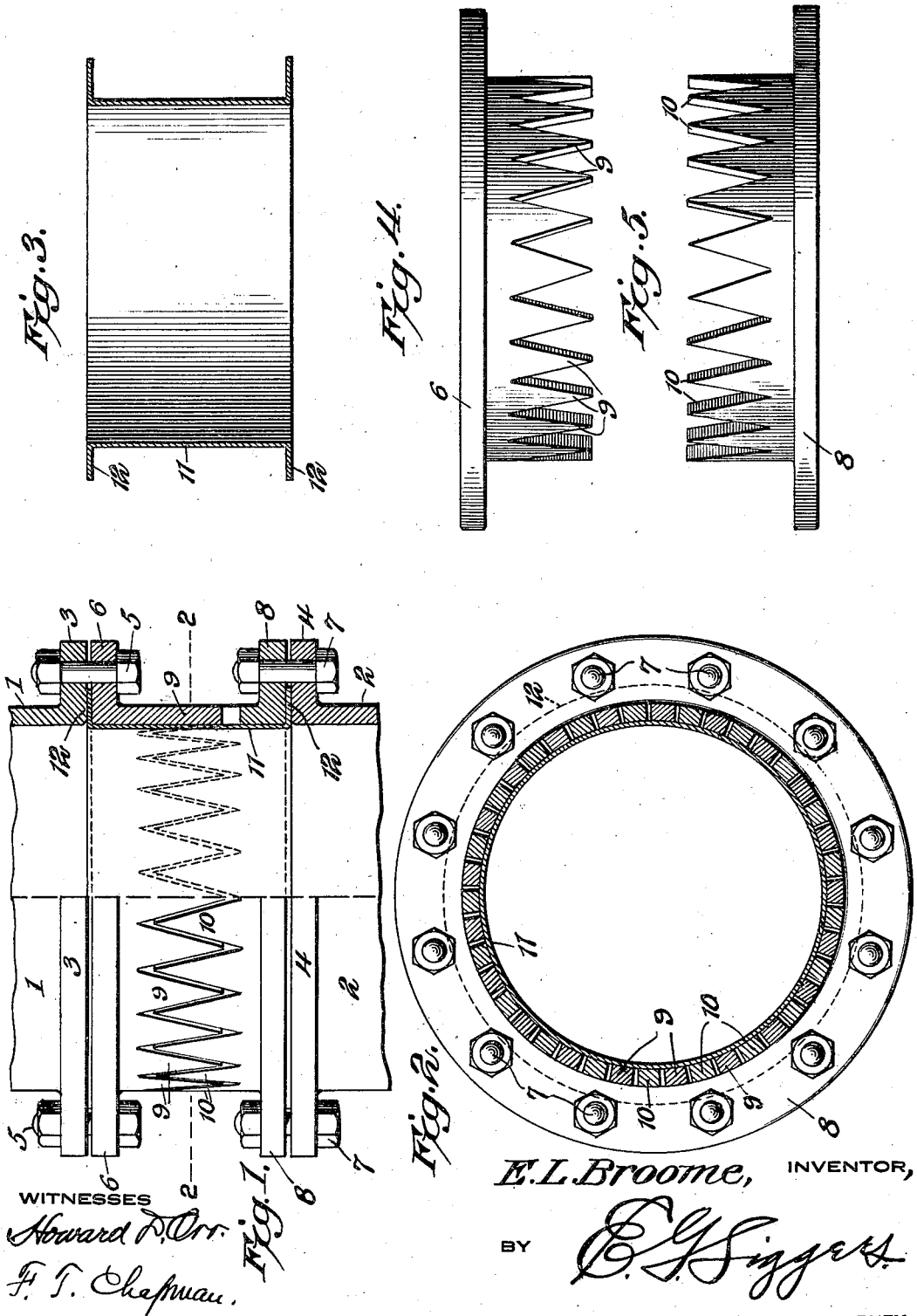
WITNESSES
Howard D. Orr
F. T. Chapman
E. L. Broome, INVENTOR,
BY
ATTORNEY

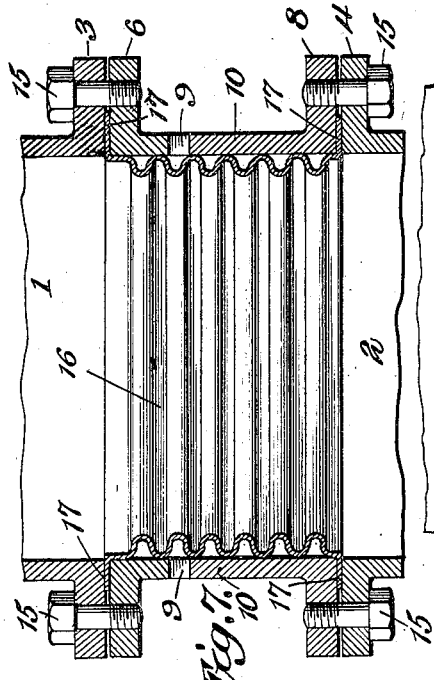
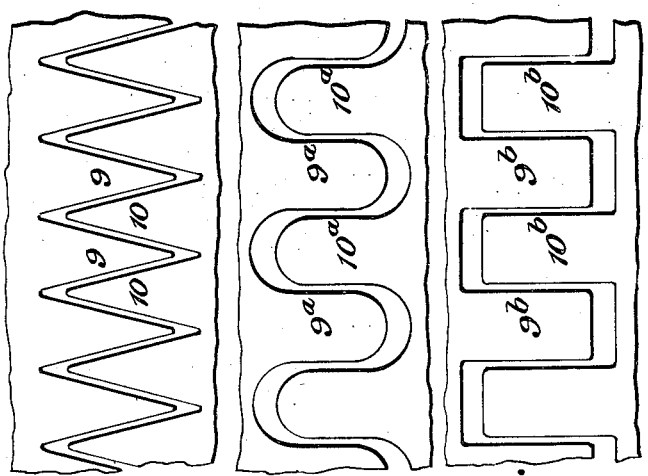
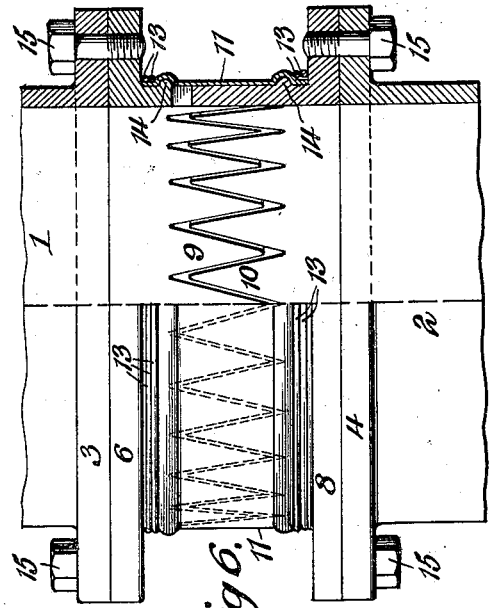
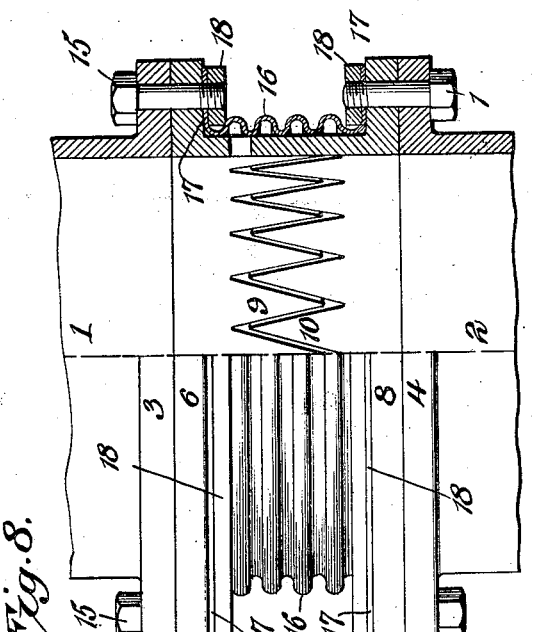

Patented June 24, 1924.

1,499,050

UNITED STATES PATENT OFFICE.

ERNEST L. BROOME, OF TARRYTOWN, NEW YORK.

FLEXIBLE EXPANSION JOINT.

Application filed June 17, 1921. Serial No. 478,345.

*To all whom it may concern:*

Be it known that I, ERNEST L. BROOME, a citizen of the United States, residing at Tarrytown, in the county of Westchester and State of New York, have invented a new and useful Improvement in Flexible Expansion Joints, of which the following is a specification.

This invention has reference to methods of reinforcing the flexible members of expansion joints by means of extensible, or retractible backing, support, reinforcement or confining members, whereby the flexible sleeve which is commonly employed in expansion joints to prevent leakage from within or without, may be made much thinner and consequently cheaper and more flexible than in other expansion joints, by the use of stronger and more rigid supporting members applied in such manner that the relatively weaker flexible sleeves are sustained against superficial bursting or collapsing pressure without impairment of their elastic capacity.

In accordance with the invention, the method of reinforcement is based upon a construction in which there are individual reinforcing rings having upon their edges, projections arranged in opposed alternate or staggered relation, so that the projections of oppositely-disposed reinforcing rings may pass by each other without coming into actual contact except when the joint is closed to its smallest contractible position.

These opposed projections or tongues are so arranged that their extremities or tops lap by or pass each other and thereby permit a condition of reinforcement upon the surface of the flexible sleeve such that there is no continuous zone of the flexible sleeve unsupported, and such portions of the flexible sleeve as are unsupported are and remain of relatively small area. The result is that the member, hereinafter referred to as the sleeve, whether composed of metal or organic material, may be thinner, more flexible and cheaper in cost than in other joints of similar proportions and used under the same conditions, and the elasticity of the sleeve with regard to extension, contraction, torsion or lateral displacement, is not restricted within the limits of amplitude for which a particular expansion joint may be constructed.

My invention obviates the necessity of employing telescopic sleeve or the incorporation of any reinforcing material in the substance of the flexible sleeve.

This method of reinforcement is particularly useful in the exhaust steam connections between steam turbines and their condensers. As the turbines and condensers are usually independently supported and are subject to temperature changes and vibrations, it is necessary to use a means of connection which is proof against leakage and of sufficient flexibility to provide for relative displacement and reinforced sufficiently to sustain the flexible sleeve against bursting or collapsing superficial pressure.

Such expansion joints are useful in pipe lines subject to temperature changes or vibration, also under like conditions in pipe connections to condensers, and connections between auxiliary apparatus, pumps and the like.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Fig. 1 is an elevation, partly in diametric section, of a joint embodying the invention.

Fig. 2 is a section on the line 2—2 of Fig. 1.

Fig. 3 is a longitudinal diametric section of an organic or fabricated flexible membrane.

Fig. 4 is an elevation of a portion of a reinforcing collar such as shown in Fig. 1.

Fig. 5 is a view similar to Fig. 4, but showing a companion reinforcing collar similar to and matching that of Fig. 4.

Fig. 6 is a view similar to Fig. 1, but showing another form of flexible sleeve applied to the exterior of the reinforcement.

Fig. 7 is a diametric section of a flexible joint in which the flexible member is interior to the reinforcement.

Fig. 8 is a view similar to Fig. 7, but showing a different application of the flexible sleeve.

Figs. 9, 10 and 11, are fragmentary displayed views of different forms of reinforcing collars.

Referring to the drawings, there is shown a flexible joint composed, generally, of two associated pipes or ducts 1 and 2, each terminating in the flange 3 or 4, as the case may be.

Secured to the flange 3, by bolts 5, is another flange 6, outstanding in like manner to the flange 3, and secured to the flange 4, by bolts 7, is another outstanding flange 8, similar to the flange 6.

The flanges 6 and 8 have like series of reinforcing tongues 9 and 10, respectively, facing and passing each other without contact. The tongues 9 form a circular series projecting from the flange 6 toward the flange 8 and the tongues 10 form a circular series projecting from the flange 8 towards the flange 6. The two flanges 6 and 8, with their respective series of tongues 9 and 10, constitute matching collars with their tongues passing each other, but separated to different extents as the collars approach or recede axially.

In the particular form shown in Figs. 1, 2, 4, 5, 6, 7, 8 and 9, the tongues 9 and 10 are approximately of triangular contour, with the point of each tongue entering between and approaching the basic portion of two adjacent tongues of the opposed series.

In the structure of Figs. 1 to 4, there is shown a sleeve 11, which may be formed of flexible organic or fabricated material, with end flanges 12, by means of which the sleeve 11 may be clamped between the flanges 3 and 6 at one end, and the flanges 4 and 8 at the other end, and held in place by the bolts 5 and 7.

In the structure shown in Fig. 6, the sleeve 11 is made fast at the ends to the reinforcing tongues 9 and 10, by means of strands 13, wound about the tongues adjacent to circumferential beads 14, so that the sleeve 11 will make fluid-tight contact with the tongues 9 and 10 between the beads 14, and overlying the tongues so as to permit approach and separation of the tongues without permitting the escape of any fluid from the interior of the joint. The flanges 3 and 4, and 6 and 8, may be joined by screws 15 instead of bolts 5 and 7, such screws being illustrated in Figs. 6, 7 and 8.

The sleeve in Fig. 7, which sleeve is indicated at 16, may be conveniently made of a sheet of corrugated metal, such as copper with flanges 17 clamped between the flanges 3 and 6, and 4 and 8, and the sleeve located interior to the reinforcing tongues 9 and 10. In the structure shown in Fig. 8, the corrugated copper sleeve 16 is placed outside of the reinforcing tongues 9 and 10, and its terminal flanges 17 are secured by a ring 18 held by the screws 15.

In the structures shown in Fig. 1 and associated figures, and in Figs. 6, 7, 8 and 9, the tongues 9 and 10 are of generally triangular or of saw-tooth contour, while in Fig. 10, there are tongues 9ª and 10ª that have rounded ends, and are more nearly rectangular, and in Fig. 11, there are tongues 9ᵇ and 10ᵇ which approach a square contour. The invention, however, is not confined to any particular shape of the tongues, except that the reinforcing members are arranged in opposed staggered relation, so that adjacent tongues slide by, or pass each other.

The invention is characterized by the production of a fluid conveying joint capable of longitudinal or transverse axial movements, or lateral displacement with a sleeve forming a flexible, impervious wall, and coacting reinforcing means for resisting the effect of pressure upon the sleeve, whether such pressure be internal to the joint, as when caused by atmospheric pressure due to vacuum conditions in the joint, or to super-atmospheric pressure initially within the joint.

In the drawings, the joints are shown as of circular cross section, but it is to be understood that they may have cross sections other than circular.

The projections 9 and 10, 9ª and 10ª, or 9ᵇ and 10ᵇ, or whatever be their shape, may be either integral with the collars from which they spring, or may be inserted or secured to them.

What is claimed is:—

1. A reinforced flexible joint for transmitting fluid, comprising a sleeve of flexible material, and coacting reinforcing collars in sustaining relation to the sleeve and movable longitudinally and transversely with respect to each other, said collars having staggered projections or tongues whereby the sleeve remains circumferentially sustained in all positions of approach and recession of said reinforcing collars.

2. A reinforced flexible joint for the passage of fluid, comprising a sleeve of flexible material, and an expansible and contractible sustaining means for the sleeve resistant to fluid pressure exerted on the sleeve, said sustaining means comprising opposed V-shaped members in staggered relation and circumferentially sustaining the sleeve in all positions of mutual approach and recession of the reinforcing means.

3. A reinforced flexible joint for the passage of fluid, comprising a sleeve of flexible impervious material, means for supporting the respective ends of the sleeve and connecting it to conduits forming opposite ends of the joint, and circular series of inflexible substantially V-shaped tongues carried by the respective supporting means and constituting means for sustaining all sections of the flexible sleeve substantially throughout its circumference, the tongues of one series extending into the spaces between the tongues of the other series.

4. An expansion joint comprising two opposed resistance members capable of approach and recession axially and transversely, each member having tapered tongues extending into the spaces between the tongues of the other member, and a flexible impervious sleeve inside of the resistance members and sustained thereby in all positions of approach and recession or of transverse displacement of said resistance members.

5. An expansion joint comprising a pair of collars movable axially toward and from each other and provided with tongues extending from each collar toward the other in staggered relation, and a flexible sleeve having its ends secured to the respective collars, with the intermediate portion of the sleeve covering the tongues on the pressure side of the tongues whereby all sections of the sleeve are supported substantially throughout the circumference.

6. An expansion joint comprising a pair of opposed and axially assembled and movable collars, each with a circular series of circumferentially spaced tongues in staggered relation, and a flexible impervious sleeve fast to and moving with the collars, the intermediate portion of the sleeve being supported by the tongues and constituting a closure between the inside and outside of the joint.

7. A reinforced joint for transmitting fluid, comprising a flexible circumferentially distortable sleeve, and relatively slidable and circumferentially movable collars, each having a series of tongues on the side of the sleeve opposite to its pressure side, the tongues of one collar extending into the spaces between the tongues of the other collar and being slightly spaced from the sides thereof, all intermediate sections of the sleeve being supported by the tongues substantially throughout the circumference of the sleeve.

8. An expansion joint comprising a flexible distortable member, means for reinforcing and supporting said member, including comparatively rigid relatively movable means in sustaining relation to said member in all positions of said rigid means, with the unsupported parts of said member in a broken line and of immaterial area.

In testimony that I claim the foregoing as my own, I have hereto affixed my signature in the presence of two witnesses.

ERNEST L. BROOME.

Witnesses:
PROSPER LUGRIN,
W. V. KULP.